CORRELATOR APPARATUS WITH AVERAGING AND SUMMING MEANS
Filed May 8, 1963
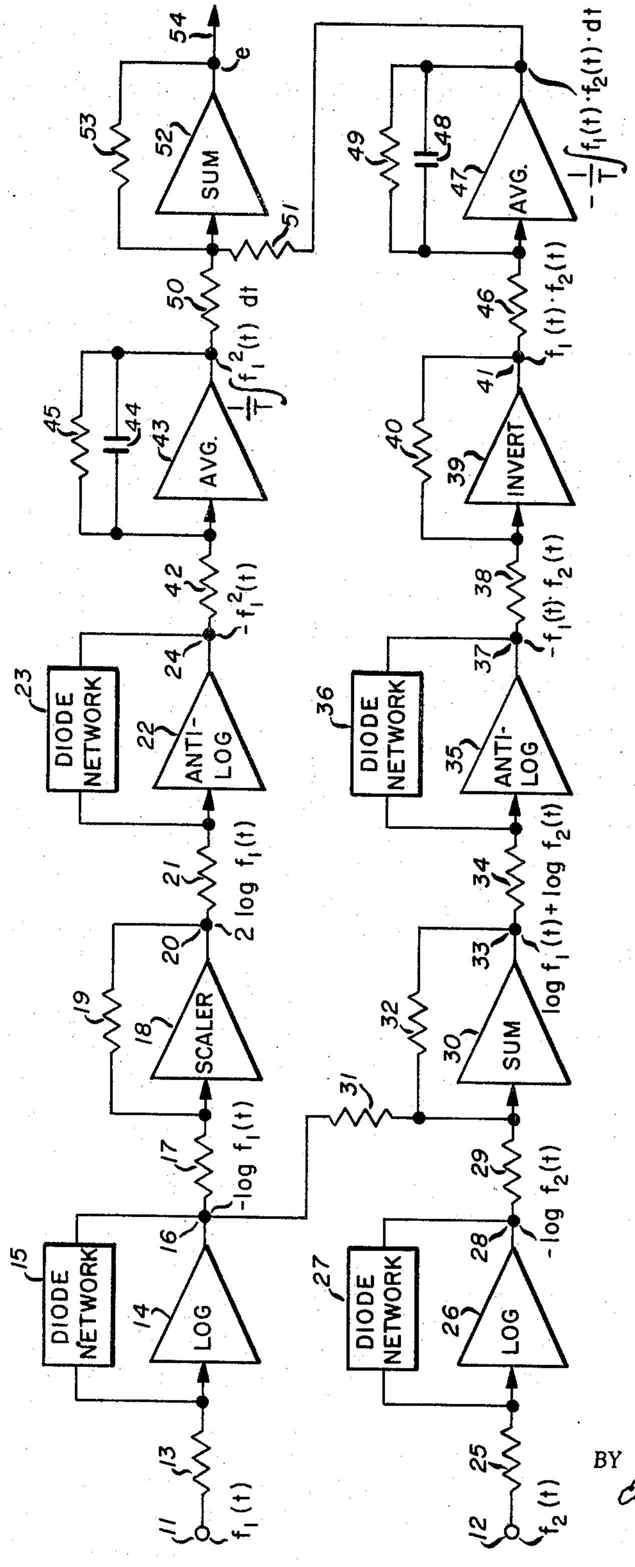
INVENTORS
EDWARD E. GRAY
RAYMOND A. LONG
IRVIN F. DAVIS
BY *Edward A. Robinson*
ATTORNEY

United States Patent Office 3,342,984
Patented Sept. 19, 1967

3,342,984
CORRELATOR APPARATUS WITH AVERAGING AND SUMMING MEANS

Edward E. Gray, Mountain View, Raymond A. Long, Santa Clara, and Irvin F. Davis, Mountain View, Calif., assignors to General Precision, Inc., Binghamton, N.Y., a corporation of Delaware Filed May 8, 1963, Ser. No. 278,893
3 Claims. (Cl. 235—181)

This invention relates to a method and apparatus for determining a correlation between different mathematical or empirical functions; and more particularly, this invention relates to an analog approach for comparing signals and functions represented thereby and for deriving an error signal which may be minimized or nulled in a servo system.

In the fields of aerial photography and photogrammetry, contour maps have been made by correlating two or more aerial photographs which show overlapping areas of terrain but which are taken from different camera angles as an airplane moves across the terrain. By a means of stereoplotting, a human operator views the two photographs in stereo and mentally correlates the photographs point by point. Contour lines are computed from a known parallax, and as the operator adjusts the optical image of one photograph with respect to the other, a contour line is followed and traced on the map which is being made. Presently, the art of photogrammetry requires that the human operator visually and mentally correlate the two overlapping aerial photographs point by point; and therefore, the process of contour mapping by photogrammetry is a rather slow process. Ordinarily, a human operator may spend several weeks in stereoplotting contour lines of a map.

It has been proposed to provide a computer for correlating and for establishing identical points, lines and terrain areas in pairs of aerial photographs whereby the human steps in stereoplotting and photogrammetry may be minimized and possibly eliminated to speed up the process of contour mapping. This proposal provides that two separate aerial photographs will be simultaneously scanned by a means such as flying spot scanning systems to develop two separate video signals. The video signals are thence correlated to provide an error signal indicative of the degree of mis-correlation between the two scanned terrain areas. After the scanning of two rasters, one or the other of the photographs may be adjusted by X movement, Y movement, rotation, or the raster size of one of the scanning means may be adjusted relative to the other. After such adjustment, another scanning step will provide a further correlation and an error signal which will indicate whether the adjustment has improved or worsened the correlation. Further adjustments may then be made for further raster scannings, and correlation determinations to minimize the error signal.

To properly correlate the overlapping terrain areas of two separate photographs, it may be necessary to optimize several adjustments in the scanning of one photograph with respect to scanning of the other. In such a system, one of the photographs may have a fixed position and may be considered as a reference while the other photograph may be moved linearally along either of two perpendicular axes, may be rotated, or one scanned raster may be enlarged or reduced. In such a system, each of the input variables or adjustments may be optimized separately; or specific variables may be optimized and thence other variables may be adjusted after which the first variable is again re-optimized.

An important component circuit of a stereoplotting system as indicated above would be a correlating circuit for comparing two video signals obtained from separate raster scannings, and for developing an analog output signal corresponding to the error in correlation between the two scannings. Heretofore, several methods of correlation have been used and proposed for obtaining a correlation function between two input signals. A basic approach to machine correlation uses the equation:

$$(1)\qquad \phi(t)=\frac{1}{T}\int_0^T f_1(t)\cdot f_2(t+\tau)\cdot dt$$

where $f_1(t)$ represents one of the input signals, $f_2(t+\tau)$ represents the other input signal, $t$ represents time, $\tau$ represents a time delay, and T represents a particular interval of time. A derivation and an analysis of the above correlation equation may be found in a textbook entitled "Automatic Feedback Control System Synthesis" by John G. Truxal, published in 1955 by the McGraw-Hill Book Company, on page 437. Using this equation, correlation is achieved when the quantity $\varphi$ $(t)$ is maximized. This correlation technique is not suitable for closed loop or servo operation since an error signal is not developed which may be used to drive the servo system toward a null. Attempts have been made to use the above formula by phase shifting all of the frequencies of one of the input signals by 90 degrees, whereupon, a null signal will result when the input signals are identical. A primary difficulty in such a method lies in the fact that no practical network can be designed which will exhibit a constant phase shift for signal frequencies over a wide bandwidth. To make such a system operate effectively, all frequencies from a few cycles per second to several hundred thousand cycles must be precisely shifted by 90 degrees, and any error in the phase shift of any frequency with respect to another frequency will introduce an inaccuracy in correlation.

Another method of correlation has been considered which involves the modulation of a carrier wave by one of the input function signals. The modulated signal is shifted 90 degrees, is filtered, and is then detected. The resultant output signal is integrated to provide an analog voltage of the cross correlation between the two input signals. Since only a single frequency (the carrier signal) is phase shifted, the problem indicated in the above paragraph appears to be solved. However, the complexity of a system of this type becomes evident when it is appreciated that modulation techniques must be used along with the generation of a carrier frequency for the sole purpose of shifting the signals by 90 degrees.

It is an object of this invention to provide an improved method and means for correlating two functions, and for generating an error signal representative of the mis-match or lack of correlation between the input signals.

Another object of this invention is to provide a method and means for correlating two separate input functions, $f_1(t)$ *and* $f_2(t)$ in accordance with an equation $$(2)\qquad e=\frac{1}{T}\int_0^T f_1^2(t)\cdot dt-\frac{1}{T}\int_0^T f_1(t)\cdot f_2(t)\cdot dt$$

wherein T represents a pre-determined period of time and wherein $e$ is representative of an output error signal obtained from such correlation.

Numerous other objects and advantages will be apparent throughout the progress of the specification which follows. The accompanying drawing illustrates a certain exemplary embodiment of the invention, and the single figure of the drawing is a circuit diagram of an analog computing network for solving the correlation equation:

$$e=\frac{1}{T}\int_0^T f_1^2(t)\cdot dt-\frac{1}{T}\int_0^T f_1(t)\cdot f_2(t)\cdot dt$$

Briefly stated, according to this invention, a first of the input signals, $f_1(t)$, squared and averaged over a pre-determined time, such as the time required for a single raster scanning. During this same time interval, the first and second input signals, $f_1(t)$ *and* $f_2(t)$ are multiplied together, and the product is averaged. The two average signals are combined with opposite polarity with respect to each other, such that a difference signal is derived. The difference signal is representative of the error in correlation.

As shown in the drawing, analog signals representative of the two functions $f_1(t)$ and $f_2(t)$ are impressed upon input terminals 11 and 12. A resistor 13 passes the first analog signal from the terminal 11 to the summing junction of an operational amplifier 14. The amplifier 14 is provided with a feedback path comprising a resistor-diode function generating network 15. Because of the diode network feedback path, the amplifier 14 is non-linear, and the output signal appearing at a point 16 will be logarithmic in character and will be representative of the logarithm of the function $f_1(t)$. Since there is a phase inversion in the amplifying step, the signal appearing at the point 16 will actually be representative of the negative quantity, $-\log f_1(t)$.

Operational amplifiers have been used in conjunction with resistor diode networks to provide non-linear amplifier characteristics in analog computing circuits; and therefore, the logarithmic amplifier 14 may be a conventional device. An amplifier of this type is disclosed in a textbook, "Analog Computation," by Albert S. Jackson, published in 1960 by the McGraw-Hill Book Company, with specific reference to FIGURE 12–27, page 448.

A resistor 17 couples the signal appearing at the point 16 to the summing junction of an operational amplifier 18. The amplifier 18 is a linear amplifier provided with a feedback resistor 19, and the values of the resistors 17 and 19 are scaled or proportioned with a 1:2 ratio with respect to each other such that the output signal appearing at a point 20 will have a value twice that of the input signal. Since the amplifier 18 likewise inverts the phase of the signal, the output signal appearing at the point 20 will be representative of the quantity, $2 \log f_1(t)$. Another resistor 21 passes the analog signal from the point 20 to the summing junction of a further amplifier 22. The amplifier 22 is provided with a resistor diode feedback network 23 such that the output signal will be the anti-logarithm input signal. The amplifier inverts the phase of the signal; and therefore, the output signal appearing at a point 24 will be representative of $-f_1^2(t)$. It may be appreciated that the combination of amplifiers 14, 18 and 22 constitutes a means for generating the square of the first input signal $f_1(t)$.

A resistor 25 will pass the second input signal from the input terminal 12 to the summing junction of the non-linear amplifier 26. The amplifier 26 is provided with a resistor diode feedback network 27 such that the output of the amplifier 26 will be effectively the negative logarithm of the input function. The amplifier 26 may be similar in structure and function to the amplifier 14. The analog signal appearing at a point 28 will be passed via a resistor 29 to the summing junction of another amplifier 30, and the analog signal appearing at the point 16 will be passed via a resistor 31 to the summing junction of the operational amplifier 30. The amplifier 30 is provided with a feedback resistor 32 and will therefore generate a linear output corresponding to the sum of the signals appearing at the points 16 and 28. The signal appearing at the output point 33 will be representative of the quantity, $\log f_1(t)+\log f_2(t)$. A resistor 34 couples the analog signal from the point 33 to the summing junction of another non-linear amplifier 35. The amplifier 35 is provided with a function generating diode network 36 as a feedback path whereby the output signal appearing at a point 37 will be the anti-logarithm of the signal at the point 33, and will correspond to the product of the two input signals, $-f_1(t)\cdot f_2(t)$. It may be appreciated that the combination of amplifiers 14, 26, 30 and 35 constitutes a means for multiplying the two input signals to obtain a signal corresponding to the product thereof. A resistor 38 will pass the analog signals from the point 37 to the summing junction of a linear amplifier 39. The amplifier 39 is provided with a feedback resistor 40 equal in value to the resistor 38 such that the output signal appearing at a point 41 will be equal to but the negative of the input signal. Therefore, the signal at the point 41 will correspond to the positive value of the product, $f_1(t)\cdot f_2(t)$.

A resistor 42 passes the analog signal from the point 24 to the summing junction of an operational amplifier 43. A capacitor 44 and a resistor 45 are provided a feedback path for the operational amplifier 43; and therefore, this amplifier will integrate and average the signal from the point 24. The use of a combination of a resistor and a capacitor as a feedback path for an operational amplifier is disclosed on pages 4–8 of the textbook, "Analog Computation," supra. In a similar manner, the signal from the point 41 is passed by a resistor 46 to an amplifier 47 having a capacitor 48 and a resistor 49 coupled as a feedback path. The averaged signals from the amplifiers 43 and 47 are passed via respective resistors 50 and 51 to the summing junction of an operational amplifier 52. The amplifier 52 is provided with a feedback resistor 53 and will have linear characteristics such that the signal appearing at an output terminal 54 will be representative of the sum of the averaged functions from the amplifiers 43 and 47. As indicated by the drawing, the output signal from the amplifier 43 represents the positive average of the square of the first function, and the output signal from the amplifier 47 is representative of the negative average of the product of both input signals. Since the signs of these two signals are opposite from each other, the final output signal appearing at the terminal 54 will be representative of the difference of the two signals. As indicated in the Equation 2 above, this difference constitutes the error signal, $e$.

The amplifier 39 performs a function of inverting the product signal, $f_1(t)\cdot f_2(t)$ such that the two averaged signals from the amplifiers 43 and 47 will be of opposite sign with respect to each other; and therefore, when combined by the summing amplifier 52, a signal representative of the difference will result. As obvious alternatives to the structure shown and described above would be to place the inverting amplifier 39 between the amplifier 22 and 43 such that the signal representing the square of the first function $f_1^2(t)$ will be inverted in phase. The two signals being summed by the amplifier 52 will then be opposite in sign and a difference signal will result. The inverting amplifier 39 may also be placed between either of the averaging amplifiers 43 and 47 and the final summing amplifier 52 whereby one of the averaged signals is inverted prior to being combined with the other averaged signal. The output signal, $e$, appearing at the terminal 54 may be either positive or negative depending upon the relative values of the two signals being summed by the amplifier 52. It is desirable that the error signal, $e$, may be either positive or negative to provide an appropriate drive in a servo loop. Obviously, the position of the inverting amplifier 39 may be placed in either the upper chain of amplifiers or the lower chain of amplifiers as shown in the drawing such that the polarity of the output signal, $e$, will be compatible with the servo mechanism of which this correlating system may be a part.

It may be appreciated that the correlation system of this invention will compare two separate function signals to derive an appropriate error signal which may be driven to a null in a servo loop. This result is accomplished without the necessity for shifting the phase of any of the signals by 90 degrees as has been attempted in prior art correlating systems.

Changes may be made in the form, construction and arrangement of the parts without departing from the spirit of the invention or sacrificing any of its advantages, and the right is hereby reserved toa make all such changes as fall fairly within the scope of the following claims.

The invention is claimed as follows:

1. Apparatus for correlating a first function represented by a first analog signal with a second function represented by a second analog signal, said apparatus comprising: an analog means coupled to receive the first analog signal and operable to generate a third analog signal corresponding to the square of the first function; an averaging means coupled to receive the third analog signal and operable to generate a fourth analog signal corresponding to an average value of the square of the first function; another analog means coupled to receive both the first and the second analog signals and operable to generate a fifth analog signal corresponding to the product of the first function and the second function; another averaging means coupled to receive the fifth analog signal and operable to generate a sixth analog signal corresponding to an average value of the product of the first and second functions; and a summing means coupled to receive the fourth analog signal and the sixth analog signal and operable to generate an output signal corresponding to correlation error.

2. Apparatus for correlating a first function represented by a first analog signal and a second function represented by a second analog signal, said apparatus comprising: an analog means coupled to the first and second analog signals and operable to generate an error signal in accordance with the equation:

$$e=\frac{1}{T}\int_0^T f_1^2(t)\cdot dt-\frac{1}{T}\int_0^T f_1(t)\cdot f_2(t)\cdot dt$$

wherein $f_1$ is representative of the first function, $f_2$ is representative of the second function, $t$ is representative of time, T is representative of a pre-determined interval of time, and $e$ is representative of the error signal; said analog system including a means for receiving the first analog signal and for generating a third analog signal corresponding to the square of the first function, another analog means coupled to receive both the first and the second analog signals and operable to generate a fourth analog signal corresponding to the product of the first and second functions, averaging means coupled to the third and to the fourth analog signals and operable to generate a fifth and a sixth analog signal corresponding to the respective averages of the third and fourth signals; and a summing means for generating the difference between the fifth and sixth analog signals.

3. Apparatus for correlating a first function represented by a first analog signal with a second function represented by a second analog signal, said apparatus comprising: an analog means coupled to receive the first analog signal and operable to generate a third analog signal corresponding to the logarithm of the first function; a second analog means coupled to receive the third analog signal and operable to generate a fourth analog signal corresponding to twice the logarithm of the first function; a third analog means coupled to receive the fourth analog signal and operable to generate a fifth analog signal corresponding to the square of the first function; an averaging means coupled to receive the fifth analog signal and operable to generate a sixth analog signal corresponding to an average value of the square of the first function; a fourth analog means coupled to receive the second analog signal and operable to generate a seventh analog signal corresponding to the logarithm of the second function; a summing means coupled to receive the third and the seventh analog signals and operable to generate an eighth analog signal corresponding to the sum of the logarithms of the first and second functions; a further analog means coupled to receive the eighth analog signal and operable to generate a ninth signal corresponding to the product of the first and second functions; another averaging means coupled to receive the ninth analog signal and operable to generate a tenth analog signal corresponding to an average value of the product of the functions; and an output summing means coupled to receive the sixth and tenth analog signals and operable to generate a difference signal corresponding to the error in correlation between the first and second functions.

References Cited

UNITED STATES PATENTS

| | | | |
|---|---|---|---|
| 2,907,400 | 10/1959 | Swafford | 235—181 X |
| 2,927,656 | 3/1960 | Feagin et al. | 235—181 X |
| 2,965,300 | 12/1960 | Radley et al. | 235—193 |

MALCOLM A. MORRISON, *Primary Examiner.*

J. RUGGIERO, I. KESCHNER, *Assistant Examiners.*